US009652538B2

(12) United States Patent
Shivaswamy et al.

(10) Patent No.: US 9,652,538 B2
(45) Date of Patent: May 16, 2017

(54) WEB CRAWLER OPTIMIZATION SYSTEM

(71) Applicant: eBay Inc., San Jose, CA (US)

(72) Inventors: Gurudatta Horantur Shivaswamy, Saratoga, CA (US); Gaurav Kukal, San Jose, CA (US); Jaino Joseph, San Jose, CA (US); Greeshma Katipally, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 464 days.

(21) Appl. No.: 14/103,676

(22) Filed: Dec. 11, 2013

(65) Prior Publication Data
US 2015/0161257 A1 Jun. 11, 2015

(51) Int. Cl.
G06F 17/30 (2006.01)
H04N 7/16 (2011.01)
(52) U.S. Cl.
CPC ......... *G06F 17/30864* (2013.01); *H04N 7/16* (2013.01)
(58) Field of Classification Search
None
See application file for complete search history.

(56) References Cited

U.S. PATENT DOCUMENTS

| 2002/0144260 A1* | 10/2002 | Devara | H04N 21/2221 725/32 |
| 2003/0046396 A1* | 3/2003 | Richter | G06F 9/505 709/226 |
| 2006/0218279 A1* | 9/2006 | Yamaguchi | H04L 67/1008 709/226 |
| 2007/0130313 A1* | 6/2007 | King | H04L 67/2819 709/223 |

* cited by examiner

Primary Examiner — Hosain Alam
Assistant Examiner — Tuan-Khanh Phan
(74) Attorney, Agent, or Firm — Schwegman Lundberg & Woessner, P.A.

(57) ABSTRACT

Techniques for optimizing the performance of a webpage crawler are described. According to various embodiments, historical web crawler performance data is accessed, the data describing a performance of a web crawler during various time periods in one or more prior days. A capacity of the web crawler to fulfill uniform resource locator (URL) crawl requests for an upcoming given time period is then estimated, based on the historical web crawler performance data. Thereafter, a plurality of URL crawl requests are distributed to the web crawler during the upcoming given time period, based on the estimated capacity of the web crawler.

14 Claims, 9 Drawing Sheets

| DAY | HOUR OF DAY | | | | |
|---|---|---|---|---|---|
| | 00 | 01 | 02 | ... | 23 |
| Today | 100k | 200k | 415k | | 202k |
| Today – 1 | 90k | 220k | 215k | | 202k |
| Today – 2 | 110k | 180k | 315k | | 196k |
| ... | ... | ... | ... | ... | ... |
| Average | 100k | 200k | 315k | | 200k |

*Fig. 5*

WEB CRAWLER OPTIMIZATION SYSTEM

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for optimizing the performance of a webpage crawler.

BACKGROUND

A web crawler is a computer program that visits a webpage and scans that webpage for visible text, data, keywords, hyperlinks, and the content of the various tags used in the webpage, such as keyword rich meta tags. Each of the webpages to be crawled may be accessible via a particular reference link, such as a uniform resource locator (URL) or uniform resource identifier (URI). Entire websites or specific pages thereof can be selectively visited and indexed by a web crawler. Alternative names for a web crawler include web spider, web robot, bot, crawler, and automatic indexer.

BRIEF DESCRIPTION OF THE DRAWINGS

Some embodiments are illustrated by way of example and not limitation in the figures of the accompanying drawings in which:

FIG. 5 illustrates an example of a data table storing various historical performance data associated with a web crawler, according to various embodiments;

DETAILED DESCRIPTION

Figure 1:
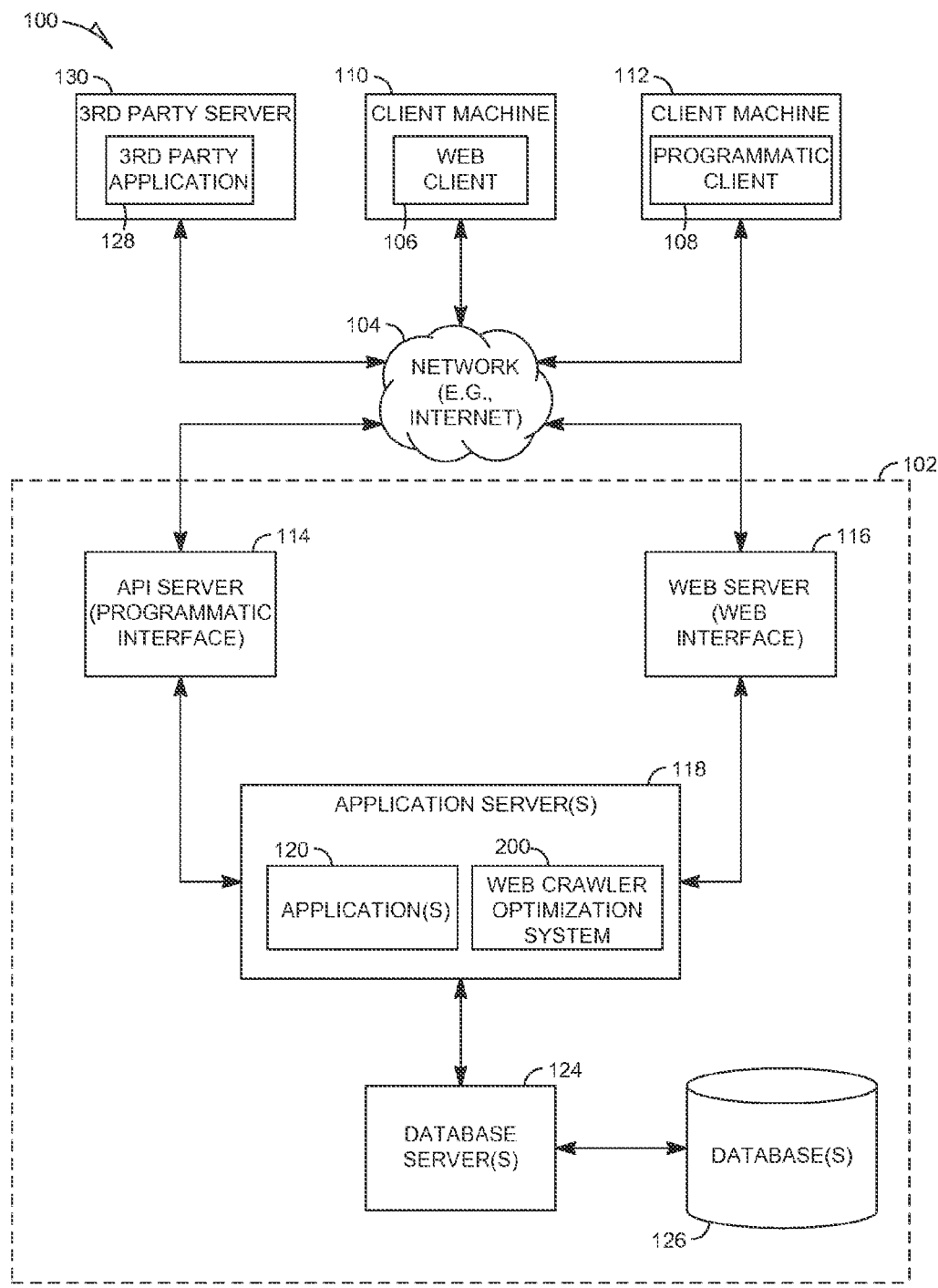
FIG. 1 is a network diagram depicting a client-server system, within which one example embodiment may be deployed.

Example methods and systems for optimizing the performance of a webpage crawler are described. In the following description, for purposes of explanation, numerous specific details are set forth in order to provide a thorough understanding of example embodiments. It will be evident, however, to one skilled in the art that the present invention may be practiced without these specific details.

Generally, a conventional web crawler can be viewed as a black box system with finite capacity/bandwidth. At some times, the number of requests distributed to the crawler far outweighs the crawler's capacity, leading to delays in processing requests. At other times, however, a crawler may be underutilized. Accordingly, various embodiments herein describe a system for optimizing the performance of a web crawler. In some embodiments, the system estimates a capacity of a web crawler for a given time period, and distributes URL crawl requests to the web crawler based on the estimated capacity. More specifically, in some embodiments, the web crawler optimization system described herein includes a capacity analyzer that estimates how much capacity the crawler has (and thus how many requests may be transmitted to the crawler) at a given time. Requests are then distributed to the crawler by the system, based on the capacity estimated by the capacity analyzer module.

The web crawler optimization system described herein may use a detailed and novel approach for estimating capacity. For example, in one exemplary embodiment, the system may take into account the average number of requests transmitted to the crawler at a specific time interval (e.g., 4-5 pm) over the past n days, as well as the average number of requests transmitted to the crawler at adjacent time intervals (e.g., 5-6 pm) over the past n days (e.g., to be sensitive to whether the crawler is about to become active). In other embodiments, the system may take into account a preconfigured estimate for the daily capacity of the crawler, and then modify this preconfigured estimate based on a performance of the crawler over the past few days (e.g., to represent that the crawler is consistently performing at a high or low level over the past few days). The system may process each of the aforementioned values to estimate the current capacity of the crawler at the specific time interval (e.g., 4-5 pm), as described in more detail below.

In some embodiments, the web crawler optimization system may be associated with an online retailer or marketplace website(e.g., eBay). Accordingly, when crawling for competitor prices from competitor retailer websites (e.g., for the purposes of price comparison), the system may also include intelligence regarding whether it is even necessary to send a request to a crawler, based on previous requests and how often the competitor changes their prices. For example, if the price for item X on Amazon changes once every three days, the system prevents a request to crawl an Amazon item listing for item X from being transmitted to the crawler, if a similar request was previously submitted less than three days ago.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the web crawler optimization system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 hosts what is referred to herein as a web crawler optimization system 200. The 200 is described in more detail below in conjunction with FIG. 2.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
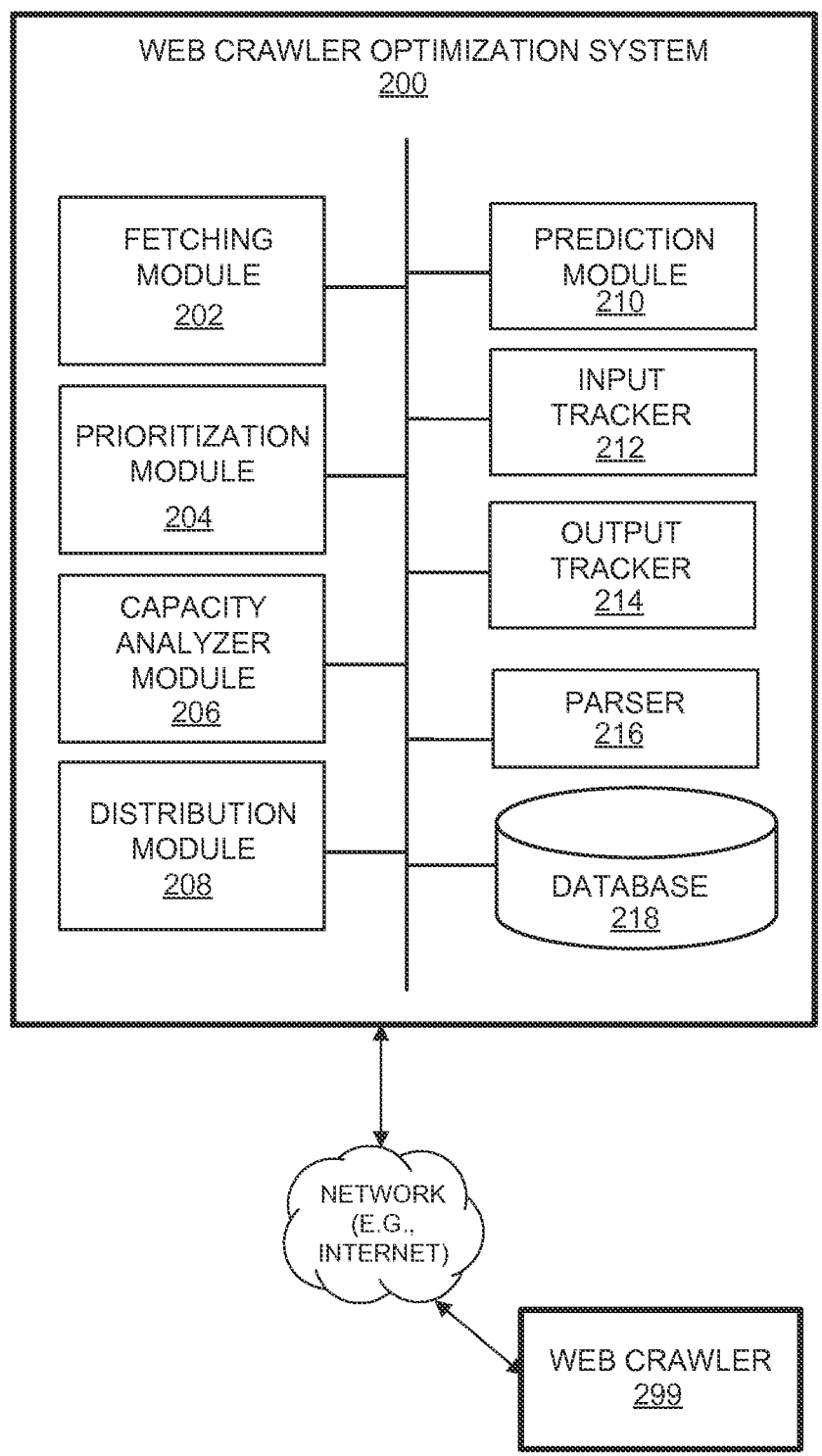
FIG. 2 is a block diagram of an example system, according to various embodiments.

Turning now to FIG. 2, a web crawler optimization system 200 includes a fetching module 202, a prioritization module 204, a capacity analyzer module 206, a distribution module 208, a prediction module 210, an input tracker 212, an output tracker 214, a parser 216, and a database 212. The modules of the web crawler optimization system 200 may be implemented on or executed by a single device such as a web crawler optimization device, or on separate devices interconnected via a network. The aforementioned web crawler optimization device may be, for example, one of the client machines (e.g. 110, 112) or application server(s) 118 illustrated in FIG. 1. The operation of the aforementioned components of the web crawler optimization system 200 will now be described in conjunction with the schematic data flow diagram 300 in FIG. 3.

Figure 3:
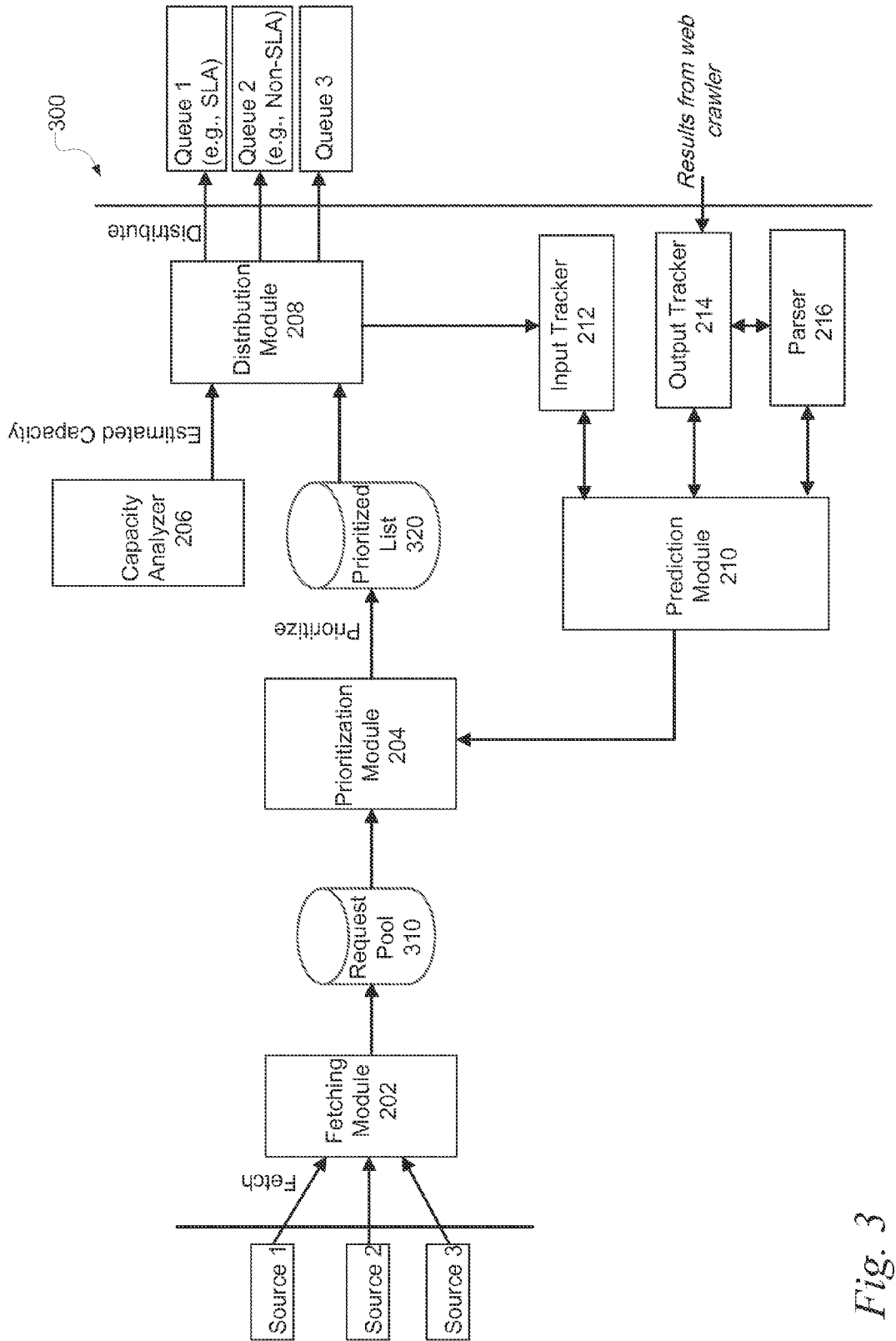
FIG. 3 is a schematic diagram illustrating an exemplary data flow in a system, according to various embodiments.

According to various exemplary embodiments, the fetching module 202 is configured to fetch URL crawl requests from various sources, as illustrated in FIG. 3. As described herein, a URL crawl request (or "request") may be a request for a web crawler to crawl a webpage accessible via a particular URL. The 200 and/or the web crawler may be associated with a retailer website (e.g., eBay) and may be configured to crawl competitor websites for comparative pricing information. Thus, the URL crawl requests described herein may correspond to requests to crawl an item listing webpage hosted by a competitor retailer website.

Such URL crawl requests may originate from various generic sources, such as different applications, databases, user interfaces, APIs, etc., associated with a retailer website (e.g., eBay.com). Accordingly, the fetching module 202 is configured to fetch such URL crawl requests from these various sources, such as by accessing predetermined storage locations associated with the various sources.

In some embodiments, a source may be a database or repository identifying the current top-selling products on the eBay site by product ID (e.g., eBay "epid" number), or a database or repository identifying the current low-selling products on the eBay site. Accordingly, the fetching module 202 may fetch such information from these sources, and analyze the corresponding product ID to find an equivalent product ID utilized by a competitor. For example, the fetching module 202 may include a mapping engine that can map eBay product IDs to competitor or product IDs and infer what the appropriate competitor URL is. Thus, the fetching module 202 may then generate the appropriate URL crawl request.

Figure 4A:
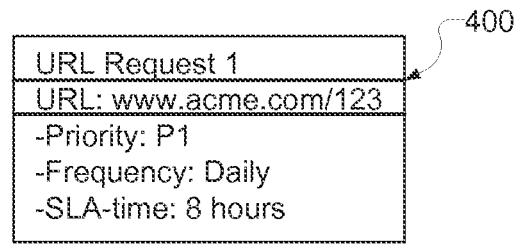
FIG. 4A illustrates an example of information included in a URL crawl request, according to various embodiments.

In some embodiments, each URL crawl request may specify a particular URL of a webpage to be crawled, and may be associated with use case information such as a priority level associated with the URL crawl request (e.g., low, medium, high, or P1, P2, P3, etc., a service level agreement (SLA) time or deadline for the crawling to be completed by (e.g., this URL needs to be crawled within 3 hour or 6 hours), and a frequency for crawling (e.g., repeated every 8 hours, repeat daily, etc.). For example, FIG. 4A illustrates an example of use case information 400 associated with a URL crawl request including a URL request ID, URL, priority level, SLA-time, and frequency. Such priority levels, SLA-times, and frequencies may be defined for URL requests in the context of crawling for competitor prices because perhaps popular products on a retailer site (e.g., eBay) may be more important and need to be collected faster or more frequently than products which are not selling well on the retailer.

The fetching module 202 may automatically designate the priority, SLA-time, and/or frequency associated with the URL requests based on default values associated with each source. For example, if a URL crawl request is fetched from a first data source (e.g., database identifying popular items on a retailer website), then the fetching module may automatically assign that the URL crawl requests with a particular priority, frequency, and/or SLA-time (e.g., a high priority, a low frequency, low SLA-time), whereas if the URL crawl request is fetched from the second data source (e.g., second database identifying unpopular items in a retailer website), then the fetching module may automatically assign the URL crawl request with another priority, frequency, and/or SLA-time (e.g., a low priority, a low-frequency, a high SLA-time).

Figure 4B:
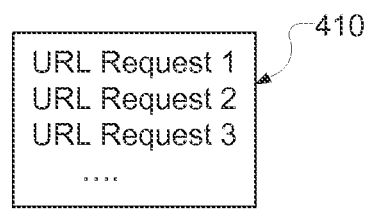
FIG. 4B illustrates an example of information included in a request pool, according to various embodiments.

Thereafter, the fetching module 202 is configured to input the fetched URL crawl requests into a request pool 310 as illustrated in FIG. 3. The request pool 310 may correspond to a data table (or similar data structure and a database) that stores or lists a plurality of requests. For example, FIG. 4B illustrates an exemplary request pool including a list 410 of various URL crawl requests. Information associated with each URL crawl request (e.g., see FIG. 4A) may be stored in the request pool 310. The fetching module 202 may also maintain information about a "fetch time" or "drop time" indicating when this request was fetched from the source and/or inserted into the request pool 310 (which may be utilized in conjunction with and SLA time to determine when the request needs to be fulfilled by).

Figure 4C:
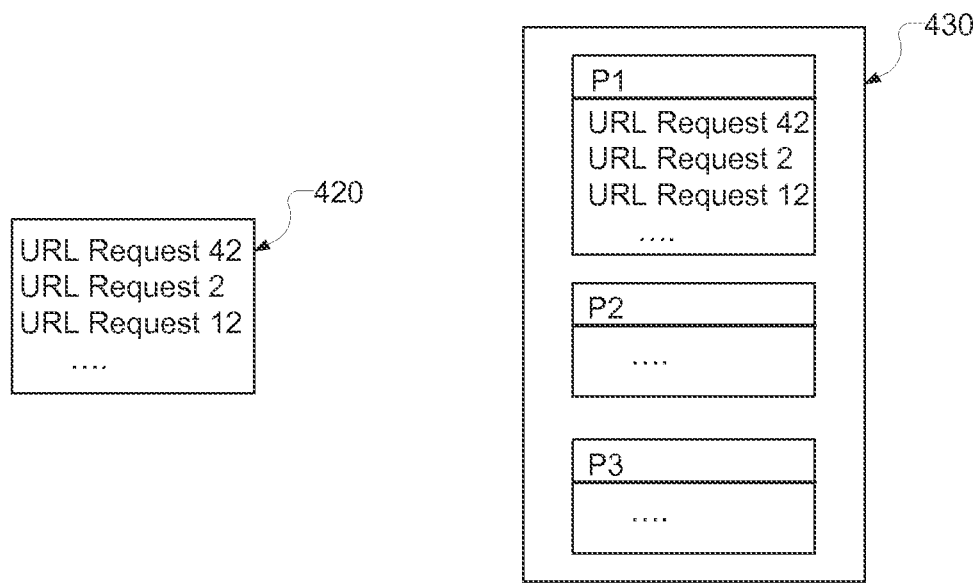
FIG. 4C illustrates an example of information included in various lists of prioritized requests, according to various embodiments.

According to various exemplary embodiments, the prioritization module 204 is configured to prioritize the requests in the request pool 310, based on various factors, in order to generate a prioritized list 320 of requests, as illustrated in FIG. 3. For example, as described above, each URL request in the request pool 310 may be associated with a priority level, and SLA-time, and a frequency. Accordingly, the prioritization module 204 may prioritize each URL crawl request based on each of the aforementioned factors, either alone or in combination with other factors, in order to generate a prioritized request list 320. For example, in some embodiments, the prioritization module 204 may prioritize the request based on priority level alone. For example, FIG. 4C illustrates an exemplary prioritized request list including a prioritized list 420 of requests. In some embodiments, the prioritization module 204 may prioritize the request by placing all the requests associated with a different priority levels P1, P2, P3, etc., in different priority level buckets. For example, FIG. 4C illustrates an exemplary prioritized request list including a list 430 of priority data buckets containing URL crawl requests having different priorities. Thus, all the requests in the P1 buckets will be performed first, followed by the requests in the P2 bucket, and so on. On the other hand, in some embodiments, the prioritization module 204 may prioritize the request based on SLA-time alone, by placing all the requests associated with different SLA times of one hour, two-hour, three hours, etc., in different buckets. In some embodiments, the prioritization module 204 may prioritize based on a combination of both priority and SLA-time. For example, if two requests both have to be completed by 4 PM, the system prioritizes the one that has the highest priority level, On the other hand, if two requests both have the same priority level, the system prioritizes whichever one has the smallest SLA-time.

According to various exemplary embodiments, the capacity analyzer module 206 is configured to estimate a capacity of a web crawler at a given time period (e.g., a given hour of the day such as 4 PM-5 PM) and, thus, how many URL request can be sent to the web crawler (e.g., 200,000, 300,000, etc.) at the given time period. The distribution module 208 then distributes the appropriate number of URL crawl requests to the web crawler, as illustrated in FIG. 3. For example, it is possible that there are 1 million requests currently in the request pool 310 but the distribution module 208 cannot send all of them to the web crawler in a single burst without overloading the web crawler. Accordingly, the capacity analyzer module 206 may determine that, for example, out of 1 million requests currently in the request pool 310, the estimated capacity of the crawler at 4 PM is only 250 k requests. Thus, the capacity analyzer module 206 may instruct the distribution module 208 to transmit only 250 k of the requests in the request pool 310 to the web crawler. If the requests in the request pool 310 have been prioritized by the prioritization module 204 into a prioritized list 320 (as described above), then the capacity analyzer module 206 may instruct the distribution module 208 to transmit the 250 k of the requests having the highest priority or importance. More specific examples of how the capacity analyzer module 206 may estimate the capacity of the web crawler will be described in more detail below.

In the above example, 750 k requests are still waiting in the request pool 310 for the next run, and the prioritization module is continuously prioritizing the requests remaining in the request pool 310, during which time other new URL requests may have come into the pool. Thus, the various requests flow through the fetching module 202 like a stream, with new URL requests continuously coming into the request pool 310, the prioritization module continuously prioritizing the most important requests, the capacity analyzer module 206 determining how many requests to send to the web crawler, and the distribution module 208 distributing the appropriate number of the most important requests to the web crawler.

In some embodiments, the distribution module 208 may ensure that a certain capacity of the requests for forwarding to the web crawler is reserved for high priority (e.g., P1) requests. For example, consider a case where all the requests coming into (or already present in) the request pool 310 or prioritized list 320 at a particular time are tower priority level requests (e.g., P2/P3 and not P1). Now, if there are 400 K requests having priority P2/P3 in the request pool 310, and if the capacity of the web crawler is 250K for that hour of the day, the system will not exploit the entire 250 k capacity of the web crawler by sending 250 k of the P2/P3 requests, in order to avoid "starvation" for P1 requests. This is because it is possible that, just when the entire batch of 250K P2/P3 requests are being sent to the web crawler, a new batch of 300K P1 request may be received into the request pool 310 or prioritized list 320. In other words, it is possible that P1 requests are starved for the chance to be transmitted to the web crawler, due to P2/P3 requests. Accordingly, the system 200 attempts to ensure there is always some capacity left to send P1 requests to the web crawler. For example, the system 200 may utilize a preconfigured max threshold for non-P1 (e.g., P2 and P3) requests for transmitting to the web crawler (e.g., as a percentage of the total capacity of the web crawler for that hour). Thus, the prioritization module 204 may provide "VIP" treatment for high priority (e.g., P1) requests.

In some embodiments, the web crawler may have multiple queues, such as queues Q1, Q2, etc., as illustrated in FIG. 3, so that URL request can be distributed between these queues at the crawler side. For example, some of the queues may be SLA driven, whereas others may not be SLA driven (meaning that it is acceptable to miss SLA-time deadlines for the URL crawl requests sent to those non-STA queues). Note that there may be multiple queues of each type (e.g., multiple SLA driven queues and multiple non-SLA driven queues). Accordingly, the various operations of the capacity analyzer described herein may be performed based on a per queue basis. For example, the capacity analyzer module 206 may provide queue-specific information such as how many URL crawl requests may be sent to each particular queue associated with the web crawler, and the distribution module 208 will transmit the appropriate number of URL crawl requests to each queue, such as Q1, Q2, etc. Thus, even though the requests have already been prioritized into the prioritized list 320, they may be bifurcated into different queue levels (e.g., 100 k requests may be sent to Q1, 200 k may be sent to Q2, etc.). The distribution module 208 may also distribute based on different domains, such that all URL requests associated with a given domain (e.g., Google.com or Amazon.com) are sent to a particular queue.

According to various exemplary embodiments, the input tracker 212 is configured to track each request that is transmitted by the distribution module 208 to the web crawler, as illustrated in FIG. 3. The 212 may store information associated with each request, such as the URL, priority level, SLA-time, frequency, domain, transmission time of when it was transmitted to the crawler, the queue that it was transmitted to (if applicable), and so on. After a URL request is completed or fulfilled by the web crawler (i.e., after the web crawler crawls the appropriate webpage and extracts various information from the webpage), the web crawler returns the requests and/or the associated results to the web crawler optimization system 200. Accordingly, the output tracker 214 is configured to track, at a request level, each request and/or the associated results that are received back from the web crawler, as illustrated in FIG. 3. Like the input tracker 212, the output tracker 214 may store various information associated with each completed request received back from the web crawler, such as the URL, the crawled information, reception time (when it was received from the web crawler), priority level, STA-time, frequency, domain, the queue it that it was transmitted to (if applicable), and so on. The 216 is configured to parse through the crawled data in the completed request received back from the web crawler for relevant information, and to extract and store that information, as illustrated in FIG. 3. For example, if the crawled webpage is a competitor item listing webpage for an item, then the parser 216 may parse through the crawled information in order to identify a purchase price for the item that is displayed on the webpage. The 216 may thus be linked to the output tracker 214. Accordingly, based on the operation of the input tracker 212 and the output tracker 214, the web crawler optimization system 200 may determine that a particular URL request that was sent out from the distribution module 208 to the web crawler at 12 PM was completed and came back from the web crawler at 1 PM.

As described above, the capacity analyzer module 206 is configured to estimate a capacity of a web crawler. In some embodiments, the capacity analyzer module 206 may estimate the capacity of the crawler during the given time period (e.g., a particular hour of the day), based on how many requests are historically being fulfilled and returned by the crawler during that time period (e.g., an "average historical hourly performance value" for that hour of the day). For example, in some embodiments, the capacity analyzer module 206 may access the input records (maintained by the input tracker 212) and the output records (maintained by the output tracker 214), and may analyze the join of this data in order to identify the URL crawl requests that have been sent to the web crawler (as identified by the input tracker 212) and the URL crawl requests that have been fulfilled and completed by the web crawler (as identified by the output tracker 214). Thereafter, the capacity analyzer module 206 may generate a table indicating, for various historical time periods (e.g., for each hour of the past several days), the number of URL requests received back from the web crawler during each time period.

For example, FIG. 5 illustrates an example of a table 500 generated by the capacity analyzer module 206, wherein each entry in the table 500 indicates how many URL requests were received back from the web crawler during that hour on a given day. Thus, the table 500 indicates how active the crawler is at various time periods (e.g., at various hours of the day). Accordingly, the capacity analyzer module 206 may determine that, for example, during the night time, the crawler is much less active, and so it is during these times that the capacity analyzer module 206 may have an attempt to "fill in" the gaps in the output of the web crawler by transmitting more URL requests. Note that if there are multiple queues associated with the web crawler (e.g., SLA queue and non-SLA queue), then a data table 500 may be generated for each queue. Accordingly, the capacity analyzer module 206 analyzes the input data and output data for each queue (e.g., SLA queue and non-SLA queue), and may analyze this data in order to identify the URL crawl requests sent to each queue that have been received back from the web crawler, in order to generate multiple queue-specific tables similar to the table 500.

Based on the table 500 illustrated in FIG. 5, the capacity analyzer module 206 may determine an "average historical hourly performance value" for a given hour (e.g., the 12th hour of the day) for the past N number of days (e.g., the past seven days), as illustrated in the bottom of table 500. In other words, the capacity analyzer module 206 may calculate the average historical hourly performance value for a given hour (e.g., 4 PM to 5 PM), based on the average number of URL crawl requests being returned for that hour (e.g., from 4 PM to 5 PM) for the last N days. In some embodiments, the capacity analyzer module 206 directly equates the average historical hourly performance value described above to the estimated capacity for the web crawler during the given time.

In some embodiments, the capacity analyzer module 206 may consider the average number of fulfilled requests for not just the hour in question (e.g., 4 PM to 5 PM) but also the hour following it (e.g., 5 PM to 6 PM), and may select the maximum of the two as the average historical hourly performance value for the hour in question. In this way, the capacity analyzer module 206 may become more sensitive to when the crawler is active and when the crawler is about to become active. For example, if the crawler is very active in returning requests at 5 PM, the capacity analyzer module 206 attempts to exploit this by starting to place URL crawl requests at 4 PM. Hence, in order to gauge the capacity of the crawler for 4 PM, the capacity analyzer module 206 analyzes the crawler response at 4 PM and for the subsequent hour of 5 PM for the past N days, and selects the maximum (i.e., the highest average) of these two transitionary values as the average historical hourly performance value for 4 PM. In some embodiments, the capacity analyzer module 206 directly equates the average historical hourly performance value described above to the estimated capacity for the web crawler during the given time.

In some embodiments, the capacity analyzer module 206 may estimate the capacity of the crawler for a specific time period by taking the maximum of (a) the average historical hourly performance value described above and (b) a preconfigured estimate for the hourly capacity of the crawler. The capacity analyzer module 206 may consider a preconfigured estimate for the capacity of the crawler because it is possible that the average historical hourly performance value described above may be inaccurate and a temporary "false positive" (e.g., at the crawler suddenly became active due to some abnormal conditions) that does not accurately indicate a long-term trend For example, the capacity analyzer module 206 may access a value of 2.4 million as a preconfigured estimate for the daily capacity of the crawler, where such a value may be preconfigured by a user of the web crawler optimization system 200 (e.g., via a user interface displayed by the web crawler optimization system 200). The 206 may then divide this value by 24 in order to reach a value of 100 k as a preconfigured estimate for the hourly capacity of the crawler.

Moreover, in some embodiments, the capacity analyzer module 206 may either increment or decrement the preconfigured estimate value (e.g., 100 k) based on past performance of the web crawler (e.g., the performance for the past three days or for the past seven days). For example, if threshold amount (e.g., 95%) of requests that have placed over the past few days (e.g., three days or the past seven days) have been successfully fulfilled by the crawler, then the capacity analyzer module 206 may increment the preconfigured estimate value (e.g., 100 k) by a preconfigured performance modification factor (e.g., 5%). On the other hand, if the crawler is not meeting the response of 95%, then the capacity analyzer module 206 may decrement the preconfigured estimate value by the performance modification factor. The aforementioned performance threshold (e.g., 95%) and performance modification factor (e.g., 5%) may be preconfigured by a user of the web crawler optimization system 200 (e.g., via a user interface displayed by the web crawler optimization system 200). Thus, the preconfigured estimate may correspond to a "moving threshold" of a current expected capacity of the web crawler system based on information currently available, although in reality the actual capacity could be higher or lower. Thus, the preconfigured estimate may be bumped up or bumped down by the capacity analyzer module 206 depending on how the web crawler system is doing. So in the example above, if the crawler is consistently performing at a high level over the past three or seven days, then the capacity analyzer module 206 will increment the preconfigured hourly estimate value of 100 k by 5% to 105 k.

The capacity analyzer module 206 then selects the maximum of the adjusted hourly estimate value (e.g., 105 k) and the average historical hourly performance value (e.g., 125 k) for a given time period as the estimated capacity of the web crawler for this time. Thus, in the above example, the capacity analyzer module 206 determines that the capacity of the web crawler at 4 PM is 125 k. This may be performed for every hour, such as 9 PM and 8 AM.

As described above, the web crawler may be associated with a retailer website (e.g., eBay) and may be configured to crawl competitor websites for comparative pricing information. Thus, the URL crawl requests described herein may correspond to requests to crawl an item listing webpage hosted by competitor retailer websites. According to various exemplary embodiments the web crawler optimization system 200 may include the prediction module 210 configured to determine whether it is necessary to distribute a particular URL, crawl requests to a web crawler, depending on the last time a similar request was sent to the web crawler and depending on how often the price for that item changes. Since the parser 216 parses through previously crawled data (e.g., competitor prices) from URL crawl requests received back from the web crawler, the parser 216 may determine that historically the price for a specific item changes only once in three days whereas the price for another item changes every day, and so on. Thus, the prediction module 210 may predict how often or how many times a day the competitor price changes for a given product, based on input from the parser 216. Accordingly, if the system receives the same request to crawl a competitor price for an item once a day, and if the prediction module 210 determines that item price only changes once every three days, then the prioritization module 204 may determine that it is not necessary to send this request to the web crawler daily (and instead may send it once every three days). Thus, another crawl request can take its place, and the system avoids sending unnecessary and duplicative requests for product information. In some embodiments, predictions may be applied only to requests for having a specific priority level (e.g., a lower priority level such as P2, whereas requests having a higher priority may still be sent to the web crawler).

Figure 6:
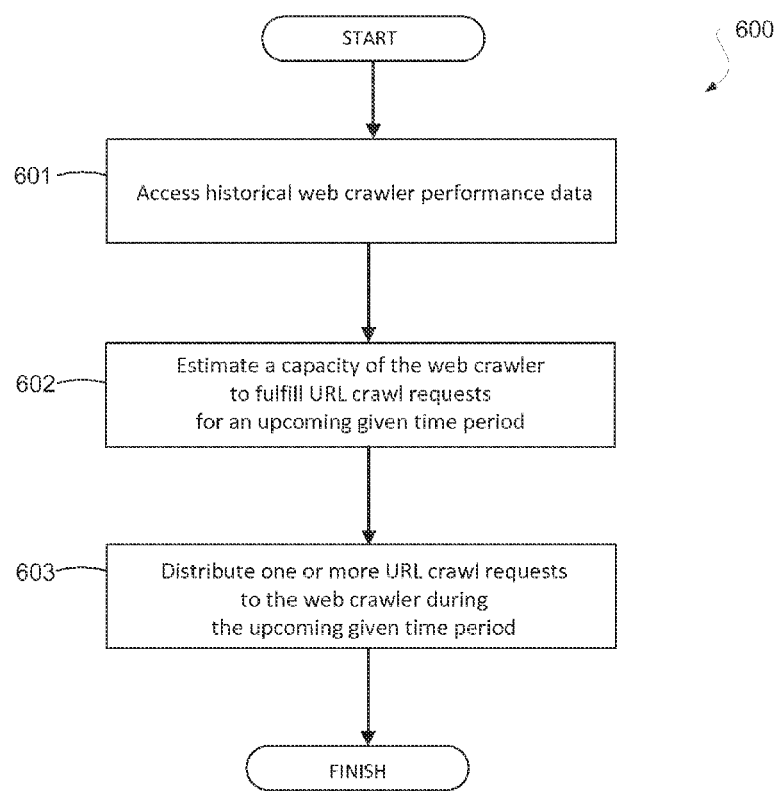
FIG. 6 is a flowchart illustrating an example method, according to various embodiments.

FIG. 6 is a flowchart illustrating an example method 600, according to various exemplary embodiments. The method 600 may be performed at least in part by, for example, the web crawler optimization system 200 illustrated in FIG. 2 (or an apparatus having similar modules, such as client machines 110 and 112 or application server 118 illustrated in FIG. 1). In operation 601 in FIG. 6, the capacity analyzer module 206 accesses historical web crawler performance data describing a performance of a web crawler during various time periods in one or more prior days. In some embodiments, the historical web crawler performance data identifies a number of URL crawl requests completed by the web crawler during the various time periods in the one or more prior days. In operation 602 in FIG. 6, the capacity analyzer module 206 estimates a capacity of the web crawler to fulfil uniform resource locator (URL) crawl requests for an upcoming given time period, based on the historical web crawler performance data that was accessed in operation 601. In operation 603 in FIG. 6, the capacity analyzer module 206 distributes one or more URL crawl requests to the web crawler during the upcoming given time period, based on the estimated capacity of the web crawler that was estimated in operation 602.

Figure 7:
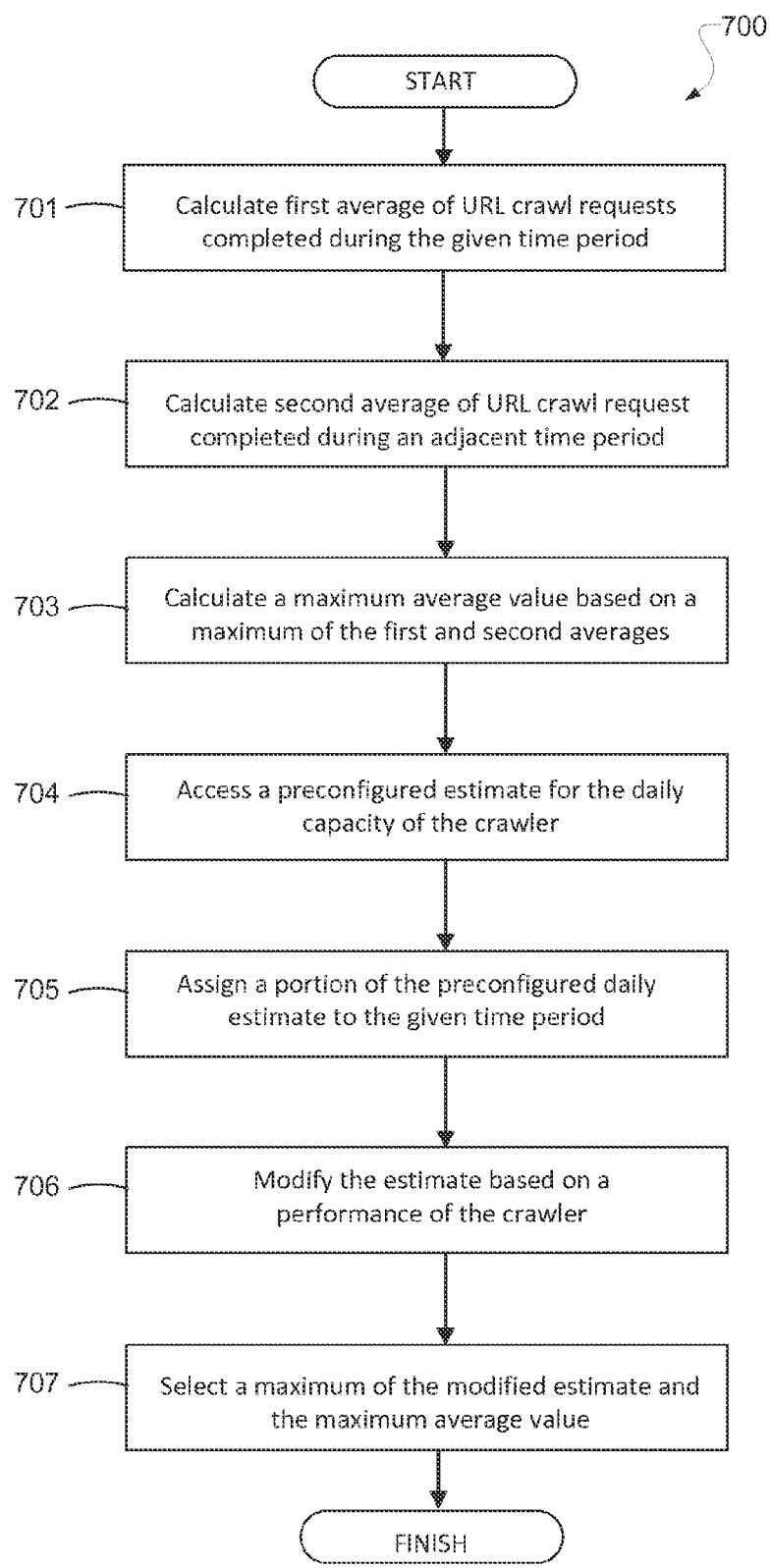
FIG. 7 is a flowchart illustrating an example method, according to various embodiments.

FIG. 7 is a flowchart illustrating an example method 700, consistent with various embodiments described above. In some embodiments, the method 700 may describe a more detailed method for estimating a capacity of a web crawler and may correspond to the operation 602 in 6. The method 700 may be performed at least in part by, for example, the web crawler optimization system 200 illustrated in FIG. 2 (or an apparatus having similar modules, such as client machines 110 and 112 or application server 118 illustrated in FIG. 1). In operation 701 in FIG. 7, the capacity analyzer module 206 calculates a first average of a number of URL crawl requests completed by the web crawler during a given time period (e.g., 4 PM to 5 PM) in one or more prior days (e.g., the last N days). In operation 702 in FIG. 7, the capacity analyzer module 206 calculates a second average of a number of URL crawl request completed by the web crawler during an adjacent time period that is adjacent to the given time period (e.g., 5 PM to 6 PM) in the one or more prior days (e.g., the last N days). In operation 703 in FIG. 7, the capacity analyzer module 206 calculates a maximum average value based on a maximum of the first average (that was calculated in operation 701) and the second average (that was calculated in operation 702).

Thereafter, in operation 704 in FIG. 7, the capacity analyzer module 206 accesses a preconfigured estimate for the daily capacity of the crawler. For example, the capacity analyzer module 206 may access data indicating that the web crawler is estimated to fulfill 2.4 million crawl requests a day. In operation 705 in FIG. 7, the capacity analyzer module 206 assigns a portion of the preconfigured daily estimate to the given time period. For example, the capacity analyzer module 206 may divide the preconfigured daily estimate (e.g., 2.4 million requests a day) by 24 in order to arrive at an hourly estimate (e.g., 100 k requests an hour). In operation 706 in FIG. 7, the capacity analyzer module 206 modifies the preconfigured estimate for the hourly capacity of the crawler based on a performance of the crawler during one or more preceding days (e.g., the last N days). For example, in some embodiments, the modifying in operation 706 may comprise determining whether the web crawler has fulfil a threshold value (e.g., 95%) of URL crawl requests sent to the crawler during the one or more preceding days (e.g., the last N days). If the capacity analyzer module 206 deter that the web crawler has fulfilled a threshold value of URL crawl requests during the one or more preceding days, then the capacity analyzer module 206 may increment the preconfigured estimate (e.g., 100 k crawl requests an hour) by a performance modification factor (e.g., increment by 5%). On the other hand, if the capacity analyzer module 206 determines that the web crawler has not fulfilled the threshold value of URL crawl requests during the one or more preceding days, then the capacity analyzer module 206 may decrement the preconfigured estimate by the performance modification factor. In operation 707 in FIG. 7, the capacity analyzer module 206 selects a maximum of the modified estimate (that was modified in operation 706) and the maximum average value (that was calculated in operation 703) as the capacity of the web crawler during the given time period. Various operations in the method 700 may be omitted or rearranged, as necessary.

Figure 8:
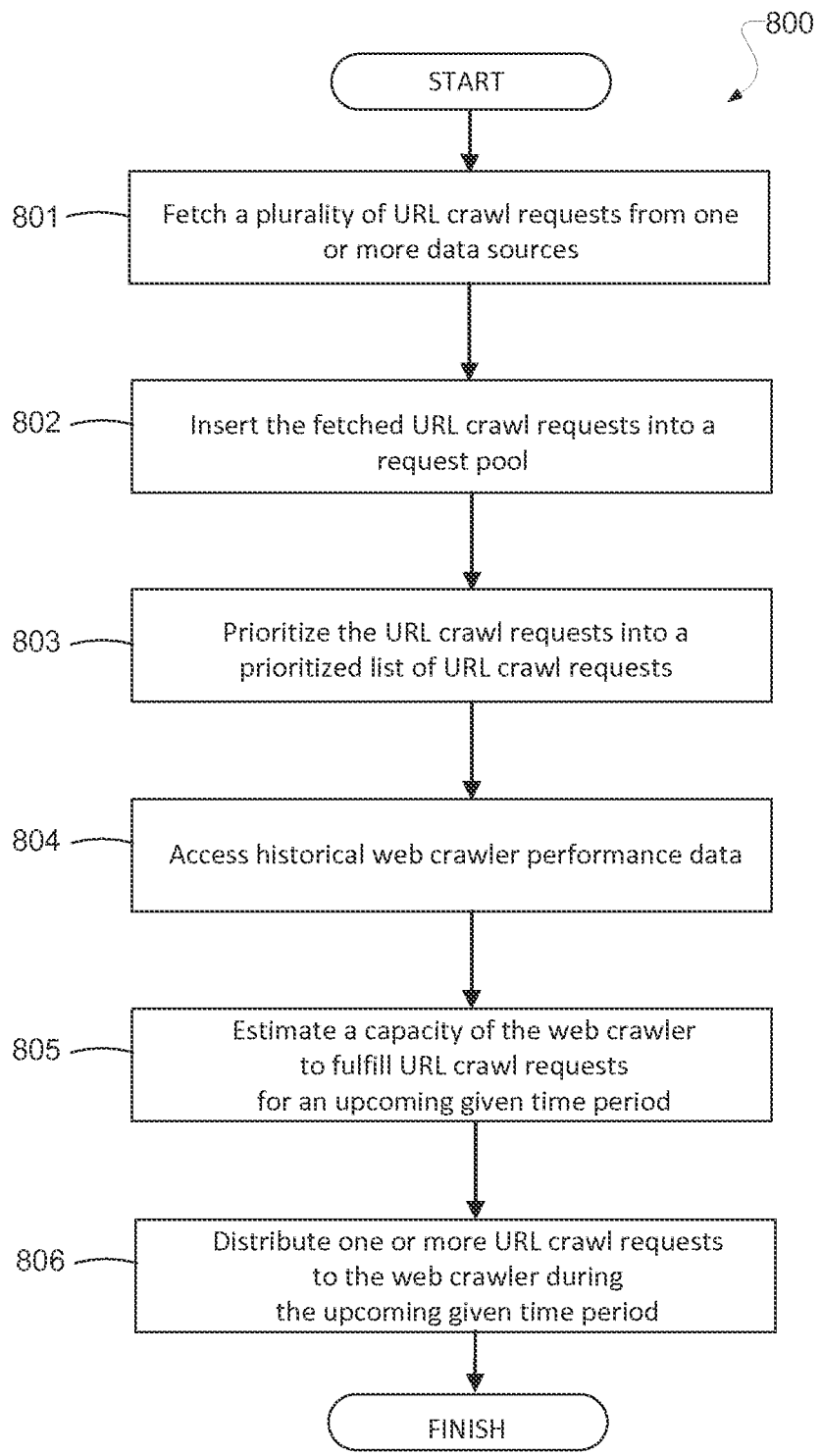
FIG. 8 is a flowchart illustrating an example method, according to various embodiments.

FIG. 8 is a flowchart illustrating an example method 800, consistent with various embodiments described above. The method 800 may be performed at least in part by, for example, the web crawler optimization system 200 illustrated in FIG. 2 (or an apparatus having similar modules, such as client machines 110 and 112 or application server 118 illustrated in FIG. 1). In operation 801 in FIG. 8, the fetching module 202 fetches a plurality of URL crawl requests from one or more data sources, each of the URL crawl requests being associated with use case information. In operation 802 in FIG. 8, the fetching module 202 inserts the fetched URL crawl requests into a request pool. In operation 803 in FIG. 8, the prioritization module 204 prioritizes the URL crawl requests into a prioritized list of URL crawl requests, based on the use case information associated with each of the URL crawl requests. Operations 804-806 may be similar to operations 601-603 in FIG. 3. In some embodiments, in operation 806 in FIG. 8, the distribution module 208 may extract, from the prioritized list of URL crawl requests (that was generated in operation 803), an amount of prioritized URL crawl requests corresponding to the estimated capacity of the web crawler (that was estimated in operation 805). Further, the distribution module 208 may transmit these extracted URL crawl requests to one or more queues associated with the web crawler. Various operations in the method 800 may be omitted or rearranged, as necessary.

In some embodiments, the system may perform a de-data deduplication check (also known as a "de-dupe" check) of the URL requests in the request pool 310 with all requests submitted in the last N hours/minutes (including URL requests for which crawling is in progress), in order to avoid submitting the same URLs again. For example, the method 800 may include an optional operation 802a (not shown in FIG. 8) performed before operation 806 (e.g., between operations 802 and 803) that comprises: de-duping the URL crawl requests in the request pool to avoid duplicates, by comparing the URL crawl requests in the request pool against URL crawl requests listed by the input tracker 212 that have been previously distributed to the web crawler during a recent time period (e.g., in the last N hours/minutes), in order to avoid resubmitting the same URL crawl requests that have been previously distributed to the web crawler.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor, or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
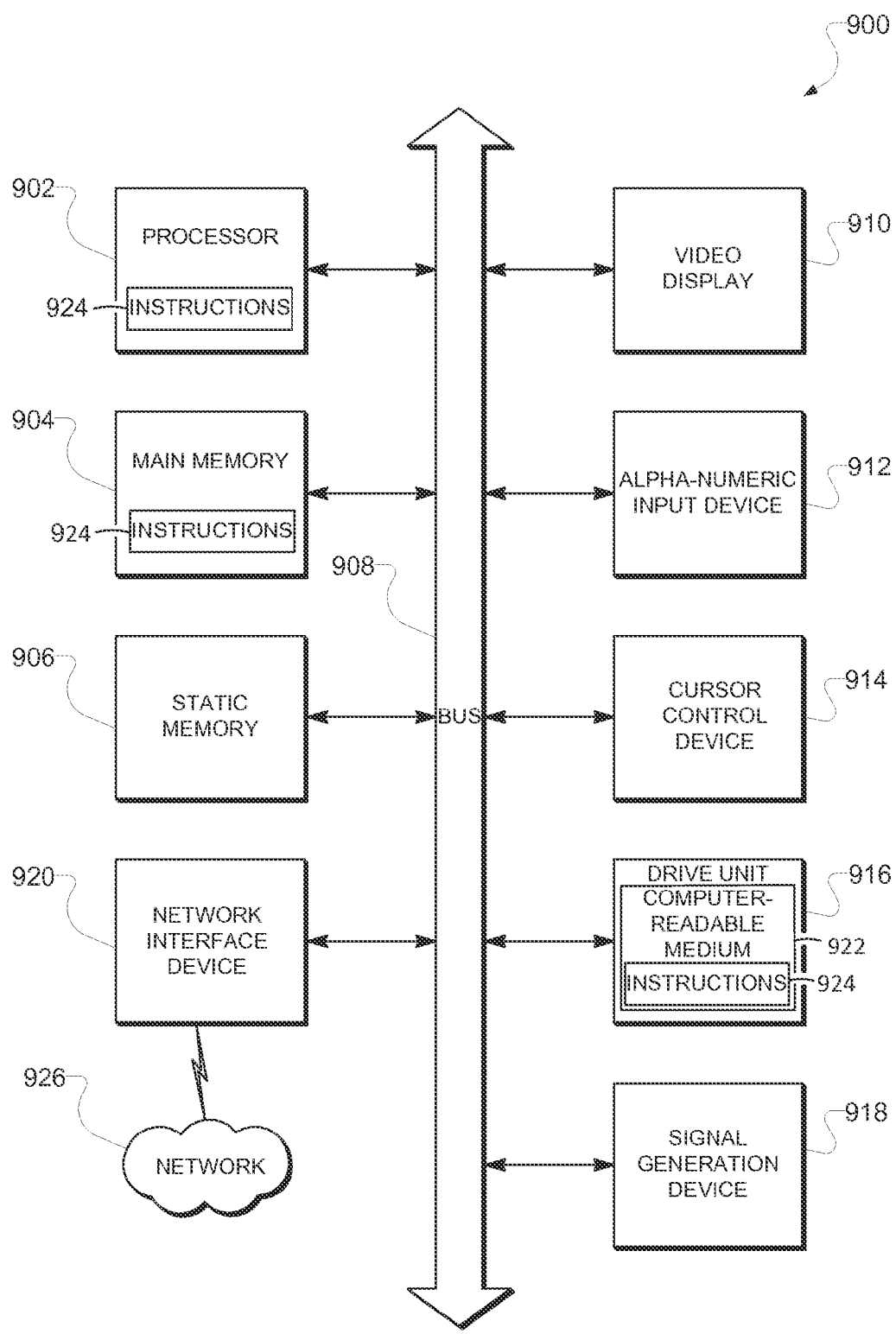
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UA) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    accessing historical web crawler performance data describing a performance of a web crawler during various time periods in one or more prior days;
    estimating a capacity of the web crawler to fulfill uniform resource locator (URL) crawl requests for an upcoming given time period, the estimating including:
        calculating, based on the historical web crawler performance data, a first average of a number of item listing page URL crawl requests completed by the web crawler during the given time period in the one or more prior days;
        calculating, based on the historical web crawler performance data, a second average of a number of item listing page URL crawl requests completed by the web crawler during an adjacent time period that is adjacent to the given time period in the one or more prior days; and
        calculating a maximum average value based on a maximum of the first average and the second average;
    distributing one or more URL crawl requests to the web crawler during the upcoming given time period, based on the estimated capacity of the web crawler;
    fetching a plurality of URL crawl requests from one or more data sources, each of the URL crawl requests being associated with use case information;
    inserting the fetched URL crawl requests into a request pool;
    performing a data deduplication process on the URL crawl requests in the request pool, based on URL crawl requests previously distributed to the web crawler during a recent time period; and
    prioritizing the URL crawl requests into a prioritized list of URL crawl requests, based on the use case information associated with each of the URL crawl requests.

2. The method of claim 1, wherein the historical web crawler performance data identifies a number of URL crawl requests completed by the web crawler during the various time periods in the one or more prior days.

3. The method of claim 1, wherein the estimating further comprises:
    accessing a preconfigured estimate for the daily capacity of the crawler;
    assigning a portion of the preconfigured estimate to the given time period;
    modifying the portion of the preconfigured estimate based on a daily performance of the crawler during one or more preceding days; and
    selecting a maximum of the modified estimate and the maximum average value as the capacity of the web crawler during the given time period.

4. The method of claim 3, wherein the modifying further comprises:
    determining whether the web crawler has fulfilled a threshold value of URL crawl requests during the one or more preceding days;
    incrementing the preconfigured estimate by a performance modification factor, responsive to determining that the web crawler has fulfilled a threshold value of URL crawl requests during the one or more preceding days; and
    decrementing the preconfigured estimate by a performance modification factor, responsive to determining that the web crawler has not fulfilled the threshold value of URL crawl requests during the one or more preceding days.

5. The method of claim 1, wherein the data sources include a database specifying URLs associated with popular products posted for sale on a retailer website.

6. The method of claim 1, wherein the use case information associated with a specific URL crawl requests includes a priority, a frequency, and a service level agreement (SLA) time associated with the specific URL crawl request.

7. The method of claim 1, wherein the distributing further comprises:
    extracting, from the prioritized list of URL crawl requests, an amount of prioritized URL crawl requests corresponding to the estimated capacity of the web crawler; and
    transmitting the extracted URL crawl requests to one or more queues associated with the web crawler.

8. The method of claim 7, wherein the one or more queues include a service level agreement (SLA) queue and a non-SLA queue associated with the web crawler.

9. A system comprising:
one or more processors and executable instructions accessible on a computer-readable medium that, when executed, cause the one or more processors to perform operations comprising:
access historical web crawler performance data describing a performance of a web crawler during various time periods in one or more prior days;
estimate a capacity of the web crawler to fulfill uniform resource locator (URL) crawl requests for an upcoming given time period, including:
calculate, based on the historical web crawler performance data, a first average of a number of item listing page URL crawl requests completed by the web crawler during the given time period in the one or more prior days;
calculate, based on the historical web crawler performance data, a second average of a number of item listing page URL crawl requests completed by the web crawler during an adjacent time period that is adjacent to the given time period in the one or more prior days; and
calculate a maximum average value based on a maximum of the first average and the second average;
distribute one or more URL crawl requests to the web crawler during the upcoming given time period, based on the estimated capacity of the web crawler;
fetch a plurality of URL crawl requests from one or more data sources, each of the URL crawl requests being associated with use case information;
insert the fetched URL crawl requests into a request pool;
perform a data deduplication process on the URL crawl requests in the request pool, based on URL crawl requests previously distributed to the web crawler during a recent time period; and
prioritize the URL crawl requests into a prioritized list of URL crawl requests, based on the use case information associated with each of the URL crawl requests.

10. The system of claim 9, wherein the capacity analyzer module is further configured to:
access a preconfigured estimate for the daily capacity of the crawler;
assign a portion of the preconfigured estimate to the given time period;
modify the portion of the preconfigured estimate based on a daily performance of the crawler during one or more preceding days; and
select a maximum of the portion of the modified estimate and the maximum average value as the capacity of the web crawler during the given time period.

11. The system of claim 9, wherein the capacity analyzer module is further configured to:
extract, from the prioritized list of URL crawl requests, an amount of prioritized URL crawl requests corresponding to the estimated capacity of the web crawler; and
transmit the extracted URL crawl requests to one or more queues associated with the web crawler.

12. A hardware storage device having stored therein a set of program instructions which, when executed by a machine causes the machine to perform operations comprising:
accessing historical web crawler performance data describing a performance of a web crawler during various time periods in one or more prior days;
estimating a capacity of the web crawler to fulfill uniform resource locator (URL) crawl requests for an upcoming given time period, the estimating including:
calculating, based on the historical web crawler performance data, a first average of a number of item listing page URL crawl requests completed by the web crawler during the given time period in the one or more prior days;
calculating, based on the historical web crawler performance data, a second average of a number of item listing page URL crawl requests completed by the web crawler during an adjacent time period that is adjacent to the given time period in the one or more prior days; and
calculating a maximum average value based on a maximum of the first average and the second average;
distributing one or more URL crawl requests to the web crawler during the upcoming given time period, based on the estimated capacity of the web crawler;
fetching a plurality of URL crawl requests from one or more data sources, each of the URL crawl requests being associated with use case information;
inserting the fetched URL crawl requests into a request pool;
performing a data deduplication process on the URL crawl requests in the request pool, based on URL crawl requests previously distributed to the web crawler during a recent time period; and
prioritizing the URL crawl requests into a prioritized list of URL crawl requests, based on the use case information associated with each of the URL crawl requests.

13. The hardware storage device of claim 12, wherein the estimating further comprises:
accessing a preconfigured estimate for the daily capacity of the crawler;
assigning a portion of the preconfigured estimate to the given time period;
modifying the portion of the preconfigured estimate based on a daily performance of the crawler during one or more preceding days; and
selecting a maximum of the modified estimate and the maximum average value as the capacity of the web crawler during the given time period.

14. The hardware storage device of claim 12, wherein the distributing further comprises:
extracting, from the prioritized list of URL crawl requests, an amount of prioritized URL crawl requests corresponding to the estimated capacity of the web crawler; and
transmitting the extracted URL crawl requests to one or more queues associated with the web crawler.

* * * * *